UNITED STATES PATENT OFFICE.

SOLOMON CROWELL, JR., OF PALMYRA, NEW YORK.

COFFEE-POT.

Specification of Letters Patent No. 25,391, dated September 13, 1859.

*To all whom it may concern:*

Be it known that I, SOLOMON CROWELL, Jr., of Palmyra, in the county of Wayne and State of New York, have invented a new and Improved Coffee-Pot; and I do hereby declare that the following is a full and exact description thereof, reference being had to the accompanying drawings, making part of this specification,—Figure 1 being a central vertical section of a coffee-pot and side elevation of the parts within, to which my improvements are applied. Fig. 2, a central vertical section of those parts detached.

Like letters designate corresponding parts in both figures.

In the top of the pot A, (which is of ordinary construction,) is closely fitted a water-receiving cup or reservoir B, provided with a cover G. From the bottom of this cup extends a tube $b$, downward, say half way to the bottom of the pot, more or less. Another tube $c$, extends upward from the cap $d$, of a digester D, below, and fits closely over the tube $b$, as represented in the drawings. The cap $d$, fits tightly over the open top of the digester D, but so as to be readily removable from it, by hand. To the lower side of the cap is secured a concentric chamber C, the cylindrical periphery of which is made of finely perforated metal or fine wire gauze, while its conical bottom $f$, is made of simple sheet-metal and tight, as clearly shown in Fig. 2. This chamber, from its use and action, I term the "diffusing chamber." The digester D, has a perforated or wire-gauze partition $g$, a little distance from its lower edge; above which partition, the periphery of the digester is of perforated sheet-metal, or wire-gauze; while below said partition, there may be simply a few larger apertures $h$, $h$, to allow a free egress of the liquid from the bottom of the digester into the pot A. The whole apparatus is situated in the pot, as shown in the drawings.

In preparing the beverage, the ground coffee is put in the digester D, and the cap $d$, placed over it, the conical bottom $f$, of the diffusing chamber C, facilitating its entrance into the coffee, which fills the annular space between said diffusing chamber and the periphery of the digester; and the narrower this annular space, the better. The tube $b$, of the receiving cup B, is inserted in the tube $c$, of the digester cap; and the whole is then inserted into the empty pot A, and a cap $a$, placed over the spout thereof. Boiling water is then gradually poured into the receiving cup B; and passing thence down into the diffusing chamber C, slowly percolates through the perforated sides or periphery thereof, through the coffee, and out through the perforated sides and bottom of the digester into the pot A; by which time, it is sufficiently charged with the virtues and aroma of the coffee. The thinness of the mass of coffee, and the large surface of it exposed to the action of the water cause it to very rapidly part with its pure and delicious flavor and aroma, without imparting its bitter principle, which a slower mode of digesting produces, to a greater or less degree. The conical, close bottom $f$, also, by directing the current of water upward, causes it to pass more gradually and evenly through all parts of the coffee.

As soon as all the water, (which should always be at boiling temperature,) has passed through the coffee, the digesting apparatus is removed, and the pot simply covered by the lid G. The beverage, after being suitably clarified, is then ready for use. The digesting apparatus, immediately after removal, may be used again, with another pot; and thus whenever required, one apparatus, with two or more pots, will answer for making coffee continually. The whole is simple and quite inexpensive; and with it, the most careless or inexperienced cook can hardly fail to succeed in making excellent coffee.

What I claim as my invention and desire to secure by Letters Patent, is—

The combination of the perforated diffusing chamber C, having a tight, conical bottom $f$, with the concentric, perforated digester D, whereby the coffee is exposed, in a thin layer, of nearly uniform thickness, to the water percolating nearly uniformly through all parts, for the purposes herein specified.

SOLOMON CROWELL, JR.

Witnesses
J. W. CORNING,
IRA BENEDICT.

H. DAVIS
Car Brake.
No. 25,392.
2 Sheets—Sheet 1
Patented Sept. 13, 1859.
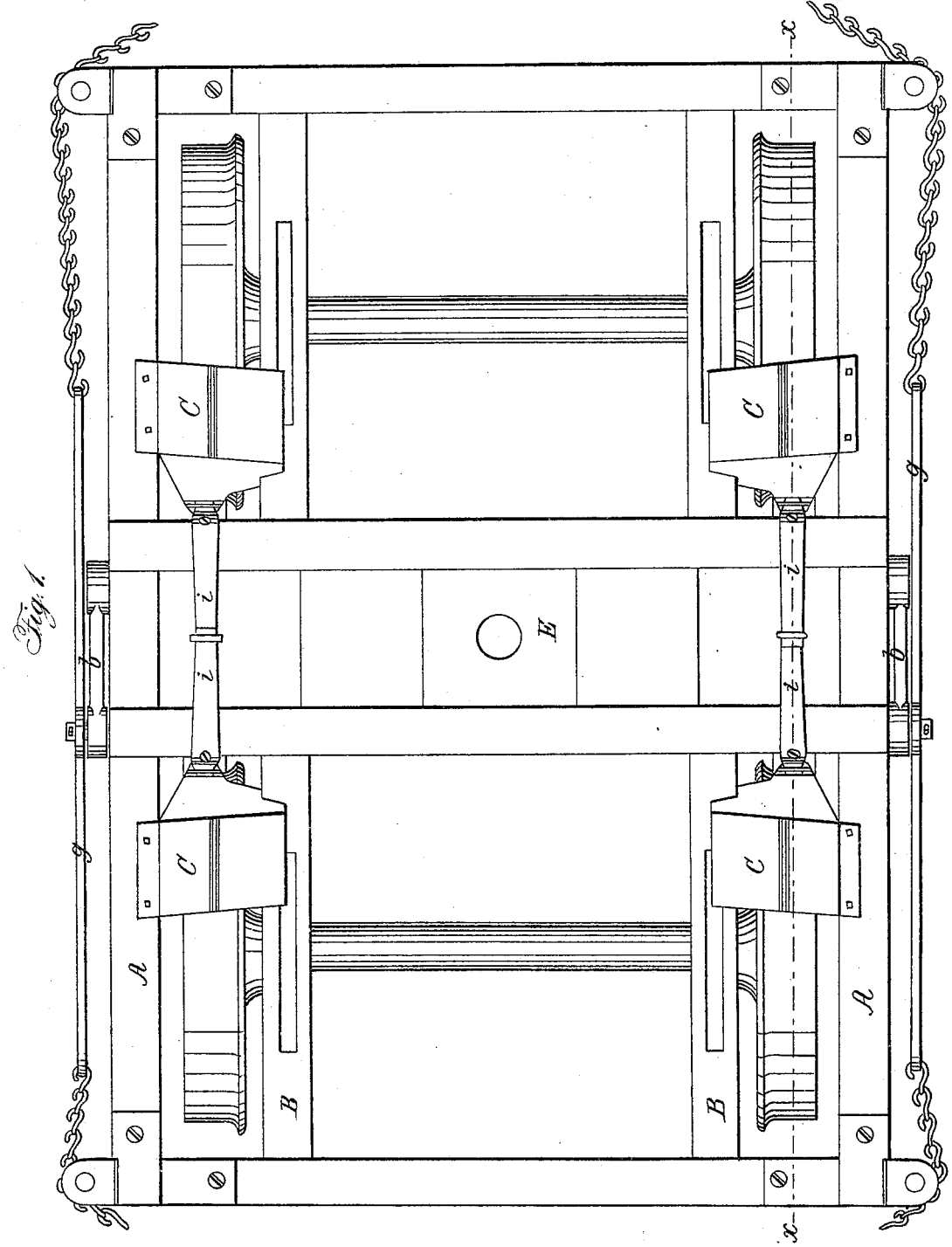
Witnesses:
Inventor: